United States Patent [19]
Ono et al.

[11] Patent Number: 5,667,571
[45] Date of Patent: Sep. 16, 1997

[54] SOLVENT-BASED BLACK INK COMPOSITION

[75] Inventors: Takashi Ono, Takatsuki; Tatsuya Yagyu, Neyagawa; Yoshihiro Sawatari, Yawata, all of Japan

[73] Assignee: Orient Chemical Industries, Ltd., Osaka-fu, Japan

[21] Appl. No.: 608,852

[22] Filed: Feb. 29, 1996

[51] Int. Cl.$^6$ .................................................. C09D 11/02
[52] U.S. Cl. ......................................... 106/31.48; 534/797
[58] Field of Search ........................... 106/22 K; 534/797

[56] References Cited

U.S. PATENT DOCUMENTS 4,968,784  11/1990  Imai et al. ......................... 106/22 K
5,480,478  1/1996  Sano et al. ......................... 106/22 K Primary Examiner—Helene Klemanski
Attorney, Agent, or Firm—Birch, Stewart, Kolasch & Birch, LLP

[57] ABSTRACT

According to the present invention, there was provided a non-pollutive ink composition using alcohol or glycol ether as a solvent. The ink composition has excellent stability against an environmental change such as a temperature change, a humidity change, etc., and storage stability in comparison with a conventional salt-formed type dye. Further, the written ink has excellent water resistance and light resistance. It can be used as various quick-drying black dye ink compositions such as writing ink, (industrial) ink-jet printing ink, stamp ink, etc.

9 Claims, No Drawings

SOLVENT-BASED BLACK INK COMPOSITION

FIELD OF THE INVENTION

The present invention relates to a solvent-based black ink composition which is used for writing ink, ink-jet printing ink and stamp ink. More particularly, it relates to a solvent-based black ink composition containing a salt-formed type and acid added type disazo basic dye salt which dissolves in alcoholic organic solvents such as alcohol, glycol, etc.

BACKGROUND OF THE INVENTION

Heretofore, there have been used various black ink compositions as writing ink, ink-jet printing ink and stamp ink, which are used for recording on materials to be recorded, such as paper, etc.

Solvent-based ink has an advantage that it dries quickly at the time of printing; the written ink hardly blurs; it is usable for be recording on a resin film; and written and recorded characters are comparatively fast. However, xylene-dissolved type solvent-based ink, and industrial solvent-based ink for ink-jet printing prepared by dispersing a pigment in a resin solution of a ketone solvent, have a problem of environmental pollution due to odor. Recently, there have been required solvent-based ink using alcoholic organic solvents such as ethyl alcohol, propylene glycol monomethyl ether, etc.

As the black dye which is superior in solubility in the alcoholic organic solvent, for example, an amine salt of azoic chrome complex salt dye, nigrosine dye and an organic acid salt thereof are known.

However, solvent-based ink using an alcohol-soluble chrome complex salt dye (e.g. C.I. SOLVENT BLACK 23, 27, 29) contains a heavy metal such as chrome, etc. and has a problem in view of safety and environmental pollution. Ink using an nigrosine basic dye also has poor storage stability.

SUMMARY OF THE INVENTION

An object of the present invention is to provide an alcoholic solvent-based black ink composition which has excellent handling safety and storage stability, as well as light resistance, water resistance and dyeability when it is written.

The present invention provides a solvent-based black ink composition containing an acid added type disazo basic dye salt represented by the formula:

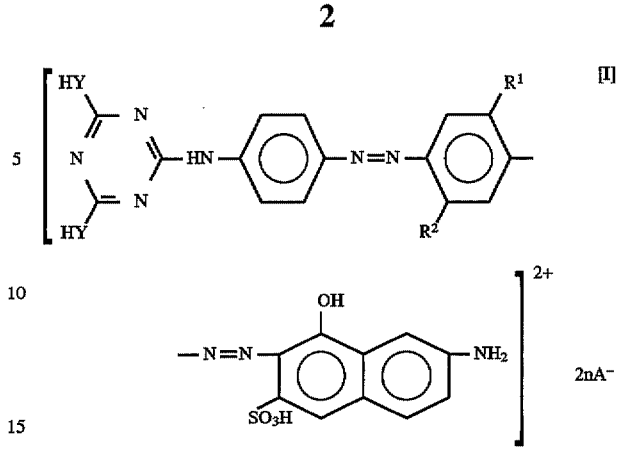

wherein $R^1$ is —H, —$CH_3$, —$OCH_3$, —$OC_2H_5$, —$OC_2H_4OH$, —$OC_2H_4OCH_3$, —$OC_2H_4OC_2H_5$ or —$OC_2H_4OC_4H_9$; and $R^2$ is —H, —$CH_3$, —$OCH_3$, —$OC_2H_5$, —$NHCOCH_3$ or —$NHCOC_2H_5$; Y is a basic group represented by the formula:

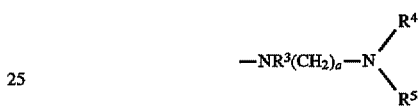

wherein $R^3$ is a hydrogen atom or a $C_1$-$C_4$ alkyl group; $R^4$ and $R^5$ are independently a $C_1$-$C_4$ alkyl group which may be substituted with a hydroxyl group, a halogen atom, a cyano group or a $C_1$-$C_4$ alkoxy group; and a is an integer of 1 to 3;

$A^-$ is a counter anion consisting of an organic acid; and n is a numerical value of not more than 1.

According to the present invention, there is provided a non-pollutive ink composition using alcohol or glycol ether as a solvent. The ink composition has excellent stability against an environmental change such as a temperature change, a humidity change, etc., and storage stability in comparison with a conventional salt-formed type dye. Further, the written ink has excellent water resistance and light resistance. It can be used as various quick-drying black dye ink compositions such as writing ink, (industrial) ink-jet printing ink, stamp ink, etc.

DETAILED DESCRIPTION OF THE INVENTION

In the present specification, the term "a basic dye base" means a basic dye having a free basic group which is in the state that it does not form a salt. The term "a basic dye salt" means a salt-formed basic dye which is prepared by adding an organic acid to the basic dye base.

The acid added type disazo basic dye salt to be used in the present invention is a salt-formed type alcohol-soluble dye which is composed of a disazo basic dye base represented by the formula:

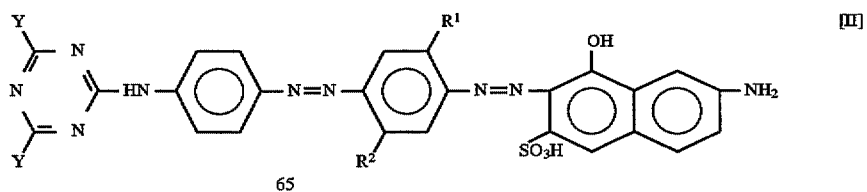

wherein $R^1$, $R^2$ and Y are the same as defined above; and an organic acid.

The disazo basic dye base is prepared, for example, by the method described in Japanese Laid-Open Patent Publication No. 63-59486. That is, the amino compound represented by the formula:

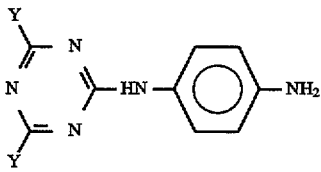 (a)

wherein Y is the same as defined above; is firstly diazotized by a conventional method, and then the resultant is coupled with the substituted amine represented by the formula:

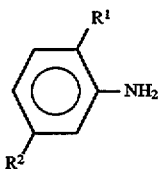 (b)

wherein $R^1$ and $R^2$ are the same as defined above; to obtain the monoazo compound represented by the formula:

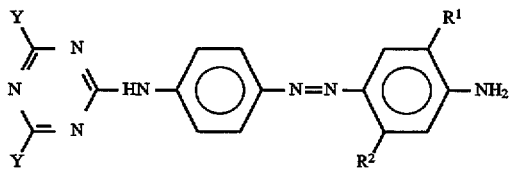 (d)

Then, the monoazo compound is further diazotized, and then coupled with the aminonaphtholsulfonic acid represented by the formula:

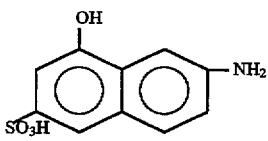 (e)

Examples of the basic group Y in the amino compound (a) include the followings.
—NH—(CH$_2$)$_3$—N(CH$_3$)$_2$,
—NH—(CH$_2$)$_3$—N(C$_2$H$_5$)$_2$,
—N(C$_2$H$_5$)—(CH$_2$)$_3$—N(C$_2$H$_5$)$_2$,
—NH—(CH$_2$)$_3$—N(C$_3$H$_7$)$_2$,
—NH—(CH$_2$)$_3$—N(C$_4$H$_9$)$_2$,
—NH—(CH$_2$)$_3$—N(C$_2$H$_4$OH)$_2$,
—NH—(CH$_2$)$_3$—N(C$_2$H$_4$Cl)$_2$,
—NH—(CH$_2$)$_3$—N(C$_2$H$_4$CN)C$_2$H$_5$,
—NH—(CH$_2$)$_3$—N(C$_2$H$_4$CN)$_2$,
—NH—(CH$_2$)$_3$—N(C$_2$H$_4$OCH$_3$)$_2$, and
—NH—(CH$_2$)$_2$—(C$_2$H$_5$)$_2$.

An amino compound (a) having the basic group Y can be prepared by reacting p-aminoacetanilide (1 mol), cyanuric chloride (1 mol) and a component for introducing the basic group Y (e.g. 2 mol of 3-diethylaminopropylamine) in an optional order, and hydrolyzing the acetylamino group.

Examples of the substituted amine (b) include the followings.
2,5-dimethoxyaniline,
2,5-diethoxyaniline,
2-methoxy-5-methylaniline,
2-methoxy-5-methoxyaniline,
2,5-dimethylaniline (2,5-xylidine),
3-methylaniline (m-toluidine),
2-methylaniline (o-toluidine),
2-methoxyaniline (o-anisidine),
2-ethoxyaniline (o-phenetidine),
5-acetylamino-2-methoxyaniline,
5-acetylamino-2-ethoxyaniline,
5-acetylamino-2-(2-ethoxyethoxy)aniline,
5-acetylamino-2-(2-methoxyethoxy)aniline, and
3-acetylaminoaniline.

A diazotization and a coupling reaction for preparing the acid added disazo basic dye salt can be carried out by a known method. For example, the diazotization is carried out in hydrochloric acid at 0° to 15° C. using sodium nitrite. The coupling is carried out by pouring a diazotized solution into a coupler solution, or pouring the coupler solution into the diazotized solution to react them at a reaction temperature of 5° to 30° C. at a reaction pH of 2 to 12.

As the organic acid of the present invention, there can be used various organic anion imparting agents which does not exert a harmful influence on the color of the basic dye base. The organic anion imparting agent may be the form of a salt or an ester of an organic acid. It may also be an anionic surfactant. Preferred anionic surfactants in the present invention are those having not less than 12 carbon atoms. Particularly preferred anionic surfactants are specifically described in "12093 Chemical Products", published by Kagaku Kogyo Nippo Co., Ltd, pages 1079–1087.

Examples thereof include carboxylates such as soaps, N-acylamino acid and the salt thereof, alkyl ether carboxyliate and acyl peptide; sulfonates such as alkylbenzenesulfonate, alkylnaphthalenesulfonate, polycondensate of formaldehyde and naphthalenesulfonate (Na, K, Li, Ca), polycondensate of formaldehyde and melaminesulfonate (Na, Ca), dialkyl sulfosuccinate, alkyl sulfoacetate, α-olefin sulfonate and N-acyl methyl taurate; sulfates such as sulfonated oil, fatty alcohol sulfate, secondary alkyl sulfate, alkyl ether sulfate, secondary higher alcohol ethoxysulfate, polyoxyethylene alkylphenyl ether sulfate, monoglysulfate and sulfate of fatty acid alkylolamide; phosphates such as alkyl ether phosphate and alkyl phosphate.

Specifically, there can be suitably used alkyl aryl sulfonic acids (salts) such as dodecyl benzenesulfonic acid (alkali metal salt); anionic surfactants such as alkyl diphenyl ether disulfonic acid (salt), sulfosuccinate (salt) and alkyl phosphate; carboxylic acid compounds such as lactic acid, propionic acid, maleic acid, malic acid, mandelic acid, benzylic acid, oleic acid and stearic acid; sulfonated ultraviolet absorbers such as monoester of dibasic acid and 2-hydroxy-4-methoxybenzophenone-5-sulfonic acid, as the organic acid of the present invention. These are used alone or in combination. It is preferred that the organic acid has 3 to 20, preferably 4 or more carbon atoms, and easily dissolves in alcohol. Thereby, a water-resistant dye salt can be obtained.

An alcohol-soluble basic dye salt can be prepared by treating the basic dye base with the organic acid according to the method known to persons skilled in the art. For example, an aqueous 3 to 5% solution of a disazo basic dye base is prepared and hydrochloric acid or acetic acid is added. The mixture is dissolved with heating and filtrated. Then, the filtrate is reacted by adding an aqueous 3 to 5% organic acid solution. The reactant is adjusted to a pH of 4 to 7 and is heated to form coarse particles, which were filtered, washed with water and dried to obtain an acid added type disazo basic dye salt. The organic acid may be added directly to an alcohol solution of the disazo basic dye base.

Examples of the acid added type disazo basic dye salt to be used in the solvent-based black ink composition of the present invention is shown in Table 1. One or more compounds selected from these shown in the column A can be used as the organic acid.

alcohol, benzyl alcohol, cyclohexanol, diacetone alcohol, etc.; monoalkyl ethers of glycols such as ethylene glycol monomethyl ether, ethylene glycol monoethyl ether, propylene glycol monomethyl ether, diethylene glycol monoethyl ether, diethylene glycol monobutyl ether, dipropylene glycol

TABLE 1

$$\left[ \begin{array}{c} HY \\ \diagdown N \\ N \diagup \\ \diagup \\ HY \end{array} N - HN - \text{C}_6\text{H}_4 - N=N - \text{C}_6\text{H}_2(R^1)(R^2) - N=N - \text{naphthyl}(OH)(SO_3H)(NH_2) \right]^{2+} \cdot 2nA^-$$

| Dye Example | $R^1$ | $R^2$ | Y | A |
|---|---|---|---|---|
| Dye Example (1) | $OCH_3$ | $CH_3$ | $-NH-(CH_2)_2-N(C_2H_5)_2$ | Anionic surfactant: Dodecyl benzene-sulfonic acid; Alkyl phosphate; Sulfosuccinate; Alkyl ether phosphate. Organic acid: Oleic acid; Maleic acid; Malic acid; Mandelic acid. |
| Dye Example (2) | $OCH_3$ | $NHCOCH_3$ | $-NH-(CH_2)_3-N(C_2H_5)_2$ | |
| Dye Example (3) | $OCH_3$ | $OCH_3$ | $-NH-(CH_2)_2-N(C_2H_5)_2$ | |
| Dye Example (4) | $OC_2H_4-OCH_3$ | $NHCOCH_3$ | $-NH-(CH_2)_3-N(C_2H_5)_2$ | |
| Dye Example (5) | $OC_2H_5-OC_2H_5$ | $OCH_3$ | $-NH-(CH_2)_3-N(C_2H_4CN)_2$ | |
| Dye Example (6) | $OCH_3$ | $OCH_3$ | $-NH-(CH_2)_3-N(C_2H_4OH)_2$ | |
| Dye Example (7) | $OC_2H_4-OCH_3$ | $NHCOCH_3$ | $-NH-(CH_2)_3-N(C_2H_4OCH_3)_2$ | |
| Dye Example (8) | $OCH_3$ | $CH_3$ | $-NH-(CH_2)_3-N(C_2H_4Cl)_2$ | |

A ratio (formulation ratio) of the basic dye base to the organic acid may be a stoichiometric amount, basically, but it can be appropriately changed a depending on solubility of the resulting basic dye salt in alcohol. The ratio in weight of the basic dye base to the organic acid is preferably within a range of 10:1 to 10:10.

When using only an organic acid such as lactic acid, glycolic acid, etc, the expected alcohol solubility may not be obtained due to lack of oil solubility. In that case, it is particularly preferred that the anionic surfactant alone or in combination with the organic acid is used to form an acid added salt.

The present invention provides a quick-drying alcoholic solvent-based black ink composition containing the acid added type disazo basic dye salt represented by the above formula [I], which is superior in water resistance and light resistance when it is written.

It is preferred that an alcoholic organic solvent is used as the liquid medium in the solvent-based ink composition of the present invention. In the present specification, the term "alcoholic organic solvent" comprises a glycolic solvent (which comprises a monoether or a monoester of glycol). Thereby, a non-pollutive ink which mainly contains the alcoholic organic solvent is provided.

Examples of the alcoholic organic solvent which can be used for the solvent-based liquid medium in the present invention include monohydric alcohols (e.g. alcohols such as ethanol, n-propanol, isopropanol, n-butanol, amyl monoethyl ether, etc.; monoacetates of glycols such as ethylene glycol monoacetate, propylene glycol monoacetate, etc.) and dihydric alcohols (e.g. glycols such as ethylene glycol, diethylene glycol, trimethylene glycol, triethylene glycol, tetraethylene glycol, polyethylene glycol, propylene glycol, butanediol, etc.)

In the present invention, one or more non-toxic or low-toxic organic solvent such as ethanol, n-propanol, isopropanol, benzyl alcohol, ethylene glycol, phenyl glycol, propylene glycol mono $C_1$-$C_2$ alkyl ether, methyl lactate, ethyl lactate, butyl lactate, γ-butyrolactone, etc. may optionally be used in combination to obtain the ink composition which do not pollute the environment.

Pyrrolidone compounds such as N-(2-hydroxyethyl)-2-pyrrolidone, N-methylpyrrolidone, 2-pyrrolidone, etc. can also be used, in an amount of less than 15% by weight based on the total amount of the ink composition.

The ink composition of the present invention is obtained by mixing and dissolving (with heating) 3 to 30% by weight, preferably 5 to 20% by weight of the acid added type disazo basic dye salt of the present invention, 60 to 90% by weight, preferably 75 to 85% by weight of the above organic solvent, 1 to 15% by weight, preferably 3 to 12% by weight of a resin, and remainder of additives, followed by filtrating. In this case, additives such as pH adjustors (e.g. alkanolamine), viscosity modifiers, rust preventives, etc. may be optionally added.

An amount of the acid added type disazo basic dye salt of the present invention contained in the ink composition may vary depending on the application of the ink composition and is not specifically limited. The amount is normally 15 to 30% by weight for a ballpoint pen, 5 to 15% by weight for a marking pen and 3 to 10% by weight for ink-jet recording.

The ink composition of the present invention can contain an alcohol-soluble resin known to persons in skilled in the art. Examples of a resin for ink includes a ketone resin, a phenol resin, low condensate of vinyl pyrrolidone, an alkyd resin, an acrylic resin, a styrene-maleic acid resin, a rosin resin, etc.

EXAMPLES

The following Examples and Comparative Examples further illustrate the present invention in detail but are not to be construed to limit the scope thereof. In the following Examples and Comparative Examples, "parts" are by weight unless otherwise stated.

Example 1

The compound (41 g, 0.05 mol) shown in Dye Example (1) of Table 1 was added to 1500 ml of water, followed by heating to about 70° C. The mixture was adjusted to a pH of 4 to 4.5 by adding acetic acid to dissolve the compound, and the solution was filtered at room temperature. On the other hand, a dodecyl benzenesulfonic acid anionic surfactant "ABS100" (33 g) manufactured by Daiichi Kogyo Seiyaku Co., Ltd. was dissolved in 1000 ml of water. The resulting solution was added dropwise to the above filtrate, and the solation was adjusted to pH 6 to 6.5 by using triethanolamine. Then, this solution was heated to 70° to 80° C., filtered, washed with water and dried to obtain 62 g of an acid added type disazo basic dye salt.

The components shown in the following Table 2 were uniformly mixed and dissolved with stirring in a closed vessel at 60° to 70° C. for 3 hour, and then filtered with a 1 μm membrane filter to prepare a black ink composition for a marking pen. Then, the storage stability of this ink composition, as well as water resistance and light resistance of the written ink were evaluated. The results are shown in Table 10.

TABLE 2

| Acid added type disazo basic dye salt | 10 Parts |
|---|---|
| Ethanol | 65 Parts |
| Benzyl alcohol | 5 Parts |
| Ethyl lactate | 10 Parts |
| Ketone resin "SYNTHETIC RESIN SK" manufactured by Hurs Co. | 5 Parts |
| Phenol resin "Tamanol 510" manufactured by Arakawa Kagaku Co., Ltd. | 5 Parts |

Comparative Example 1

According to the same manner as that described in Example 1 except for using 10 parts of a salt-formed type azo chrome complex salt dye "VALIFAST BLACK #1805" manufactured by Orient Chemical Industries Co., Ltd. in place of the acid added type disazo basic dye salt used in Example 1, a black ink composition for a marking pen was prepared. This ink composition has fair water resistance and light resistance of the written ink, but has poor black density of the written ink and poor storage stability of the ink composition.

Example 2

According to the same manner as that described in Example 1 except for using the components shown in the following Table 3, a black ink composition for a marking pen was prepared. Storage stability of this ink composition, as well as water resistance and light resistance of the written ink were evaluated. The results are shown in Table 10.

TABLE 3

| Dye Example (2) of Table 1[a] | 10 Parts |
|---|---|
| Alkyl phosphate anionic surfactant "Phosphanol RA-600" manufactured by Toho Kagaku Co., Ltd. [b] | 5 Parts |
| Ethanol | 55 Parts |
| Propylene glycol monomethyl ether | 10 Parts |
| Ethyl lactate | 10 Parts |
| Ketone resin "Hilack" manufactured by Hitachi Kasei Co., Ltd. | 5 Parts |
| Phenol resin "Hitanol 1501" manufactured by Hitachi Kasei Co., Ltd. | 5 Parts |

[a], [b] The inventive acid added type disazo basic dye salt consists of these components.

Example 3

According to the same manner as that described in Example 1 except for using the components shown in the following Table 4, a black ink composition for a marking pen was prepared. Storage stability of this ink composition, as well as water resistance and light resistance of the written ink were evaluated. The results are shown in Table 10.

TABLE 4

| Dye Example (4) of Table 1[a] | 12 Parts |
|---|---|
| Alkyl phosphate anionic surfactant "Plysurf A-207-H" manufactured by Daiichi Kogyo Seiyaku Co., Ltd.[b] | 5 Parts |
| Ethanol | 58 Parts |
| Benzyl alcohol | 5 Parts |
| Ethyl lactate | 10 Parts |
| Ketone resin "SYNTHETIC RESIN SK" manufactured by Hurs Co. | 5 Parts |
| Phenol resin "Hitanol 1501" manufactured by Hitachi Kasei Co., Ltd. | 5 Parts |

[a], [b] The inventive acid added type disazo basic dye salt consists of these components.

Example 4

According to the same manner as that described in Example 1 except for using the components shown in the following Table 5, a black ink composition for a marking pen was prepared. The storage stability of this ink composition, as well as water resistance and light resistance of the written ink were evaluated. The results are shown in Table 10.

TABLE 5

| Dye-Example (8) of Table 1[a] | 10 Parts |
|---|---|
| 2-Hydroxy-4-methoxybenzophenone-5-sulfonic acid[b] | 3 Parts |
| Propylene glycol monomethyl ether | 60 Parts |
| Ethanol | 10 Parts |
| Benzyl alcohol | 5 Parts |
| Ketone resin "Hilack" manufactured by Hitachi Kasei Co., Ltd. | 10 Parts |
| Phenol resin "Tamanol 510" manufactured by Arakawa Kagaku Co., Ltd. | 2 Parts |

[a], [b] The inventive acid added type disazo basic dye salt consists of these components.

Example 5

According to the same manner as that described in Example 1 except for using the components shown in the following Table 6, a black ink composition for marking pen was prepared. Storage stability of this ink composition, as well as water resistance and light resistance of the written ink were evaluated. The results are shown in Table 10.

TABLE 6

| | |
|---|---|
| Dye Example (7) of Table 1[a] | 10 Parts |
| Oleic acid[b] | 3 Parts |
| Propylene glycol monomethyl ether | 57 Parts |
| Ethanol | 15 Parts |
| Benzyl alcohol | 5 Parts |
| Rosin resin "Gumrosin W" manufactured by Arakawa Kagaku Co., Ltd. | 10 Parts |

[a], [b] The inventive acid added type disazo basic dye salt consists of these components.

Example 6

The components shown in the following Table 7 were dissolved with stirring in a closed vessel at 80° to 90° C. for 3 hours, and then filtered through diatomaceous earth to prepare a black ink composition for a ballpoint pen. Then, storage stability of this ink composition, as well as water resistance and light resistance of the written ink were evaluated. The results are shown in Table 10.

TABLE 7

| | |
|---|---|
| Dye Example (3) of TABLE 1[a] | 25 Parts |
| Alkyl phosphate anionic surfactant "Phosphanol RA-600" manufactured by Toho Kagaku Co., Ltd.[b] | 5 Parts |
| Oleic acid | 2 Parts |
| Phenyl glycol | 45 Parts |
| Benzyl alcohol | 10 Parts |
| Polyvinyl pyrrolidone | 1 Parts |
| Ketone resin "Hilack" manufactured by Hitachi Kasei Co., Ltd. | 12 Parts |

[a], [b] The inventive acid added type disazo basic dye salt consists of these components.

Comparative Example 2

According to the same manner as that described in Example 6 except for using 25 parts of a salt-formed type dye "VALIFAST VIOLET #1702" manufactured by Orient Chemical Industries Co., Ltd. in place of the compound shown by Dye Example (3) of Table 1, a black ink composition for a ballpoint pen was prepared. Then, storage stability of this ink composition, as well as water resistance and light resistance of the written ink were evaluated. The results are shown in Table 10. The written ink has poor black density in comparison with the ink composition of Example 6.

Example 7

The components shown in the following Table 8 were uniformly mixed and dissolved with stirring in a closed vessel at 70° to 80° C. for 3 hours, and then filtered with a 1 µm membrane filter to prepare a black ink composition for industrial ink-ink-jet printing.

TABLE 8

| | |
|---|---|
| Dye Example (5) of Table 1[a] | 10 Parts |
| Dodecyl benzenesulfonic acid anionic surfactant "ABS100" manufactured by Daiichi Kogyo Seiyaku Co., Ltd.[b] | 1 Part |
| Alkyl phosphate anionic surfactant "Phosphanol RA-600" manufactured by Toho Kagaku Co., Ltd.[c] | 4 Parts |
| Ethanol | 65 Parts |
| Ethyl lactate | 10 Parts |
| 2-Pyrrolidone | 5 Parts |
| Ketone resin "Hilack" manufactured by Hitachi Kasei Co., Ltd. | 5 Parts |

[a], [b], [c] The inventive acid added type disazo basic dye salt consists of these components.

Comparative Example 3

According to the same manner as that described in Example 7 except for using 11 parts of Solvent Black 7 "NIGROSINE BLACK EX" manufactured by Orient Chemical Industries Co., Ltd. in place of the compound shown by Dye Example (5) of Table 1, a black ink composition for industrial ink-jet recording was prepared. Then, storage stability of this ink composition, as well as water resistance and light resistance of the written ink were evaluated. The results are shown in Table 10. This ink composition has fair water resistance and light resistance of the written ink, but has poor black density of the written ink and poor storage stability of the ink composition in comparison with the ink composition of Example 7.

Example 8

According to the same manner as that described in Example 7 except for using the components shown in the following Table 9, a black ink composition for industrial ink-jet recording was prepared. The resulting ink composition was printed on a neutral paper "P (A-4)" manufactured by Xerox Co. and a corrugated board paper using an ink-jet printer "JET-A-MAR" manufactured by Mattheus Co. Water resistance and light resistance of the printed ink was evaluated. The results are shown in Table 10.

TABLE 9

| | |
|---|---|
| Dye Example (6) of Table 1[a] | 12 Parts |
| Alkylphosphate anionic surfactant "Phosphanol RA-600" manufactured by Toho Kagaku Co., Ltd.[b] | 3 Parts |
| 2-Hydroxy-4-methoxy-benzophenone-5-sulfonic acid[c] | 2 Parts |
| Ethanol | 63 Parts |
| Benzyl alcohol | 5 Parts |
| Ethyl lactate | 10 Parts |
| Phenol resin "Hitanol 1501" manufactured by Hitachi Kasei Co., Ltd. | 5 Parts |

[a], [b], [c] The inventive acid added type disazo basic dye salt consists of these components.

[Water resistance test and evaluation]

The ink composition was written on a Toyo filter paper No. 2 and dried. Then, the paper was dipped in water for one hour, drawn up and air-dried. The written ink was observed and evaluated according to the following criteria.

Evaluation criteria

5: 100 to 90% of the written ink before test is remained.
4: 90 to 70% of the written ink before test is remained.
3: 70 to 50% of the written ink before test is remained.
2: 50 to 30% of the written ink before test is remained.
1: 30 to 10% of the written ink before test is remained.
0: 0 to 10% of the written ink before test is remained.

[Light resistance test and evaluation]

The ink composition was written on an art paper (Artpost 240, manufactured by Kanzaki Seishi Co., Ltd.) and dried. Then, the written ink was irradiated in a fadeometer (carbon arc system) for 5 hours. The written ink was observed and evaluated according to the same criteria as that used in the water resistance test.

[Storage stability test and evaluation]

The ink composition was charged in a 100 ml glass bottle. The bottle was stored in a low-temperature/high-temperature container "INCUBATOR" manufactured by Sanyo Denki Co., Ltd. (temperature range: −10° to 50° C., repeated every 60 minutes) for 3 months. The ink composition in the bottle was observed whether a solid such as dye precipitated or not and whether viscosity of the ink composition increased or not, and evaluated according to the following criteria.

Evaluation criteria

⊚: An increase in viscosity of the ink composition and a precipitation of a solid are not observed.

o: An increase in viscosity of the ink composition is observed, but a precipitation of a solid is not observed.

Δ: An increase in viscosity of the ink composition and a precipitation of a solid are observed.

TABLE 10

| Ink composition | Light resistance A | Water resistance A | B | C | Storage stability |
|---|---|---|---|---|---|
| Example 1 | 5 | 5 | | | ⊚ |
| Example 2 | 5 | 5 | | | ⊚ |
| Example 3 | 5 | 5 | | | ⊚ |
| Example 4 | 5 | 5 | | | ⊚ |
| Example 5 | 5 | 5 | | | ⊚ |
| Example 6 | 5 | 5 | | | ⊚ |
| Example 7 | 5 | | 5 | 5 | ⊚ |
| Example 8 | 5 | | 4 | 5 | ⊚ |
| Comparative Example 1 | 5 | 5 | | | o |
| Comparative Example 2 | 2 | 3 | | | o |
| Comparative Example 3 | 5 | | 5 | 5 | Δ |

In Table 10, A is an evaluation by printing on an art paper, B is on a Xerox paper and C is on a corrugated board paper.

What is claimed is:

1. A solvent-based black ink composition containing:

(i) an acid added alcohol-soluble disazo basic dye salt represented by the formula:

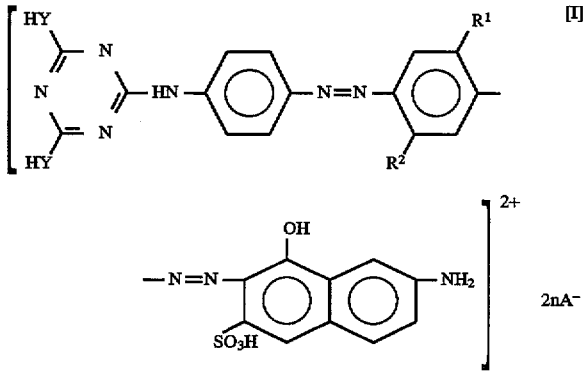

wherein $R^1$ is —H, —CH$_3$, —OCH$_3$, —OC$_2$H$_5$, —OCH$_2$H$_4$OH, —OC$_2$H$_4$OCH$_3$, —OC$_2$H$_4$OC$_2$H$_5$, or —OCH$_2$H$_4$OC$_4$H$_9$; and $R^2$ is —H, —CH$_3$, —OCH$_3$, —OC$_2$H$_5$, —NHCOCH$_3$, or NHCOC$_2$H$_5$; Y is a basic group represented by the formula:

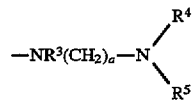

wherein $R^3$ is a hydrogen atom or a C$_1$-C$_4$ alkyl group; $R^4$ and $R^5$ are independently a C$_1$-C$_4$ alkyl group which may be substituted with a hydroxyl group, a halogen atom, a cyano group, or a C$_1$-C$_4$ alkoxy group; and a is an integer of 1 to 3;

A$^-$ is a counter anion consisting of an organic acid having 4 to 20 carbon atoms; and n is a numerical value of not more than 1; and (ii) an alcoholic organic solvent.

2. The solvent-based black ink composition according to claim 1, wherein said solvent is an alcoholic organic solvent.

3. The solvent-based black ink composition according to claim 1, which contains 1 to 30% by weight of the acid added disazo basic dye salt.

4. The solvent-based black ink composition according to claim 1, wherein the organic acid has 3 to 20 carbon atoms.

5. The solvent-based black ink composition according to claim 1, wherein the organic acid is an anionic surfactant.

6. The solvent-based black ink composition according to claim 5, wherein the anionic surfactant has not less than 12 carbon atoms.

7. The solvent-based black ink composition according to claim 5 or 6, wherein the anionic surfactant is at least one selected from the group consisting of carboxylic acids, sulfonic acids, sulfates, phosphates and the salts thereof.

8. The solvent-based black ink composition according to claim 1, wherein the organic acid is selected from the group consisting of alkyl aryl sulfonic acids, alkyl diphenyl ether disulfonic acids, sulfosuccinates, alkyl phosphates, carboxylic acids, monoesters of dibasic acid, and the mixture thereof.

9. The solvent-based black ink composition according to claim 1, wherein the organic acid is selected from the group consisting of dodecyl benzenesulfonic acid, maleic acid, malic acid, mandelic acid, benzylic acid, oleic acid, stearic acid, 2-hydroxy-4-methoxybenzophenone-5-sulfonic acid, and the mixture thereof.

* * * * *